(12) United States Patent
Tasei et al.

(10) Patent No.: US 6,409,775 B1
(45) Date of Patent: Jun. 25, 2002

(54) METHOD OF MOLDING A PLURALITY OF SOLID ELECTROLYTIC CAPACITORS ON A METAL LEAD FRAME

(75) Inventors: Masatoshi Tasei; Kenji Kuranuki, both of Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/500,898

(22) Filed: Feb. 9, 2000

(30) Foreign Application Priority Data

Feb. 9, 1999 (JP) ............................................ 11-030950

(51) Int. Cl.⁷ ........................... H01L 21/64; H01G 9/00; H01G 4/228; B29C 13/00; B29B 7/00

(52) U.S. Cl. ..................... 29/25.03; 29/25.01; 29/25.02; 264/328.8; 264/272.18; 264/272.21; 361/539; 361/540

(58) Field of Search ............................. 29/25.01–25.03, 29/729–731, 762, 763, 623.1–623.4, 838–842; 361/523, 535–541, 813, 823, 829–830, 522; 264/328.8, 272.12, 272.21

(56) References Cited

U.S. PATENT DOCUMENTS

| 4,571,662 A | * | 2/1986 | Conquest et al. ........ 361/306.1 |
| 5,198,967 A | * | 3/1993 | Kuranuki et al. ........... 361/523 |
| 6,177,723 B1 | * | 1/2001 | Eng et al. .................... 257/691 |

* cited by examiner

Primary Examiner—Ha Tran Nguyen
(74) Attorney, Agent, or Firm—Ratner & Prestia

(57) ABSTRACT

A hoop metal lead frame (1) having, solid electrolytic capacitor elements (5) on its terminal sections (2) is provided with a crosspiece (3) bridging both sides in terms of the width direction disposed along the length direction in a region between the capacitor elements (5), one crosspiece for two capacitor elements (5). The metal lead frame (1) is placed on a molding die so that the region without having the crosspiece is locating at the sub runner (8), which has branched out from the main runner (7). The capacitor elements (5) are encapsulated with a molding resin injected through the sub runner (8). Since the molding resin is not covering the crosspiece (3), the main runner portion (7) and the sub runner portion (8) can be severed from the metal lead frame (1) without effecting unwanted stress on the solid electrolytic capacitors (10). The solid electrolytic capacitors (10) thus manufactured have a superior property in the tight hermetic sealing.

8 Claims, 5 Drawing Sheets

METHOD OF MOLDING A PLURALITY OF SOLID ELECTROLYTIC CAPACITORS ON A METAL LEAD FRAME

FIELD OF THE INVENTION

The present invention relates to a method and a machine for manufacturing a solid electrolytic capacitor; more specifically, a method of encapsulating the electrolytic capacitor elements mounted on a hoop metal lead frame with a molding resin.

BACKGROUND OF THE INVENTION

A method for manufacturing a solid electrolytic capacitor that uses a conductive high polymer material for the solid electrolyte is described as an example of the conventional manufacturing method, referring to FIG. 6 and FIG. 7. FIG. 6 is a plan view showing part of a hoop metal lead frame mounted with an element for solid electrolytic capacitor. A metal lead frame 16 has a terminal section 18 provided continuously at a certain regular interval along the direction of length, and a crosspiece 19 between respective terminal sections 18 for connecting both sides of the metal lead frame in terms of the width direction. The terminal section 18 is mounted with a capacitor element 17, with electrode of the capacitor element 17 connected to the terminal section 18. A perforation 20 is for transferring the lead frame 16.

FIG. 7 is a partial plan view used to describe a method of encapsulating the capacitor element 17 of FIG. 6 with a molding resin. A main runner 21 lies close to the metal lead frame 16 along one of the sides, and a plurality of sub runner 22 branch-out from the main runner 21 covering every other crosspiece 19. Molding resin is injected from the sub runner 22 through a gate portion 23. The capacitor element 17 is encapsulated with the molding resin forming a solid electrolytic capacitor 24 on the lead frame 16. Removal of the main runner 21 and the sub runner 22 provides finished pieces of the solid electrolytic capacitor.

In the above described conventional method of manufacture, the solid electrolytic capacitors 24 formed on the metal lead frame 16 are connected with the main runner 21, the sub runner 22 and the gate portion 23, as shown in FIG. 7. The first action needed to divide the capacitors 24 into individual pieces is to separate the main runner 21 and the sub runner 22 from the solid electrolytic capacitors 24 formed on the metal lead frame 16. The action of removing the runners 21, 22 generates following problems.

A force exerted to peel the main runner 21 and the sub runner 22 off the metal lead frame 16 inevitably gives an unwanted force to the crosspiece 19 covered with the sub runner 22. The unwanted force ill affects the solid electrolytic capacitors 24. Namely, the tight adhesion between the molding resin and the lead frame 16 is deteriorated, and the hermetic sealing property of the resin-encapsulated capacitor elements 17 is degraded.

A conventional countermeasure taken to solve the above problem is to provide a blasting on the metal lead frame 16 in the area to be covered by the molding resin, for the purpose of increasing the adhesive strength to resin. However, such a countermeasure has not been effective enough to totally eliminate the adverse influence of the force exerted on the solid electrolytic capacitors 24 through said crosspiece 19. So, under the conventional method, it has been difficult to provide a sufficient assurance on the quality of solid electrolytic capacitors 24 with respect to the liermetic sealing property. Meanwhile, if one wants to separate the runners 21, 22 from the metal lead frame 16 without leaving unwanted force on the solid electrolytic capacitors 24, an expensive machine of complicated structure will be required.

The present invention aims to offer a method for manufacturing the solid electrolytic capacitors, as well as a machine for the manufacture, which can provide the solid electrolytic capacitors on the stable basis that are superior in the reliability with respect to the hermetic sealing property.

SUMMARY OF THE INVENTION

A method for manufacturing a solid electrolytic capacitor in accordance with the present invention is providing a metal lead frame with a crosspiece between every two capacitor elements along the length direction of the lead frame, providing a sub runner, which is branching out from a main runner, in a region where there is no crosspiece, and injecting a molding resin onto the capacitor elements via the sub runner. Under the above described method of manufacture, since the sub runner is not covering the crosspiece, the lead frame is not affected by unwanted forces when separating both runners from the lead frame on which the capacitor elements have been integrated. Therefore, the hermetic sealing property is not ill affected, and the solid electrolytic capacitors thus manufactured will have a superior reliability.

In the above described manufacturing method of the present invention, it is preferred to provide the metal lead frame with a reference hole at the starting point and the ending point of a span corresponding to a number of capacitor elements that can be molded at one shot, for detecting dislocation in the transfer pitch; and transferring the metal lead frame for the number of capacitor elements accordingly. The reference holes may be detected by a sensor for preventing the transfer pitch dislocation. Thus the molding operation may be conducted efficiently at a higher precision level.

When joining metal lead frames, it is preferred to have the reference hole at the end of a first lead frame and the reference hole at the beginning of a second lead frame coupled together. By joining two metal lead frames in this way, the molding operation may be carried out continuously without halting at the joint of two lead frames, or discarding the molded elements of that sector. This contributes to a further increased productivity and yield rate.

It is also preferred to provide the reference hole at only one side, in terms of the width direction, of a metal lead frame. With this configuration, a reversed lead frame can be easily detected, and the occurrence of a trouble may be prevented.

The metal lead frame having the resin-encapsulated capacitor elements is severed from the sub runner, in a manner where the sub runner is peeled off the metal lead frame while at least the metal lead frame is held firm. Since the sub runner is not covering a crosspiece, no unwanted force is given on the metal lead frame during the severance operation.

A machine for manufacturing a solid electrolytic capacitor in accordance with the present invention comprises transfer means for transferring resin-encapsulated capacitor elements integrated on a metal lead frame molded through a main runner and a sub runner, holding means for holding the metal lead frame from the upper and the bottom surfaces having an escape portion for avoiding making contact with the sub runner, and guiding means disposed at a place in the down stream of the holding means provided for guiding the main runner. The metal lead frame is severed from the sub runner by making use of the holding means. Since the severance is conducted by the guiding means, structure of the present manufacturing machine is quite simple. Thus the solid electrolytic capacitors having a superior hermetic sealing property can be manufactured for an inexpensive cost with ease.

A metal lead frame used in the manufacturing method of the present invention is provided with a plurality of terminal sections stretching in terms of the width direction, being disposed along the length direction, and a plurality of crosspieces bridging the both sides in terms of the width direction, being disposed one crosspiece for every two terminal sections along the length direction.

BRIEF DESCRIPTION OF THE DRAWINGS

FIG. 4(a) shows the end part of a first metal lead frame, FIG. 4(b) shows the beginning part of a second metal lead frame, FIG. 4(c) shows a state in which the end part of the first metal lead frame and the beginning part of the second metal lead frame have been overlaid.

FIG. 5(a) is a sectional view seen from the front, FIG. 5(b) is the side view.

DESCRIPTION OF THE PREFERRED EMBODIMENTS

Embodiment 1

Figure 1:
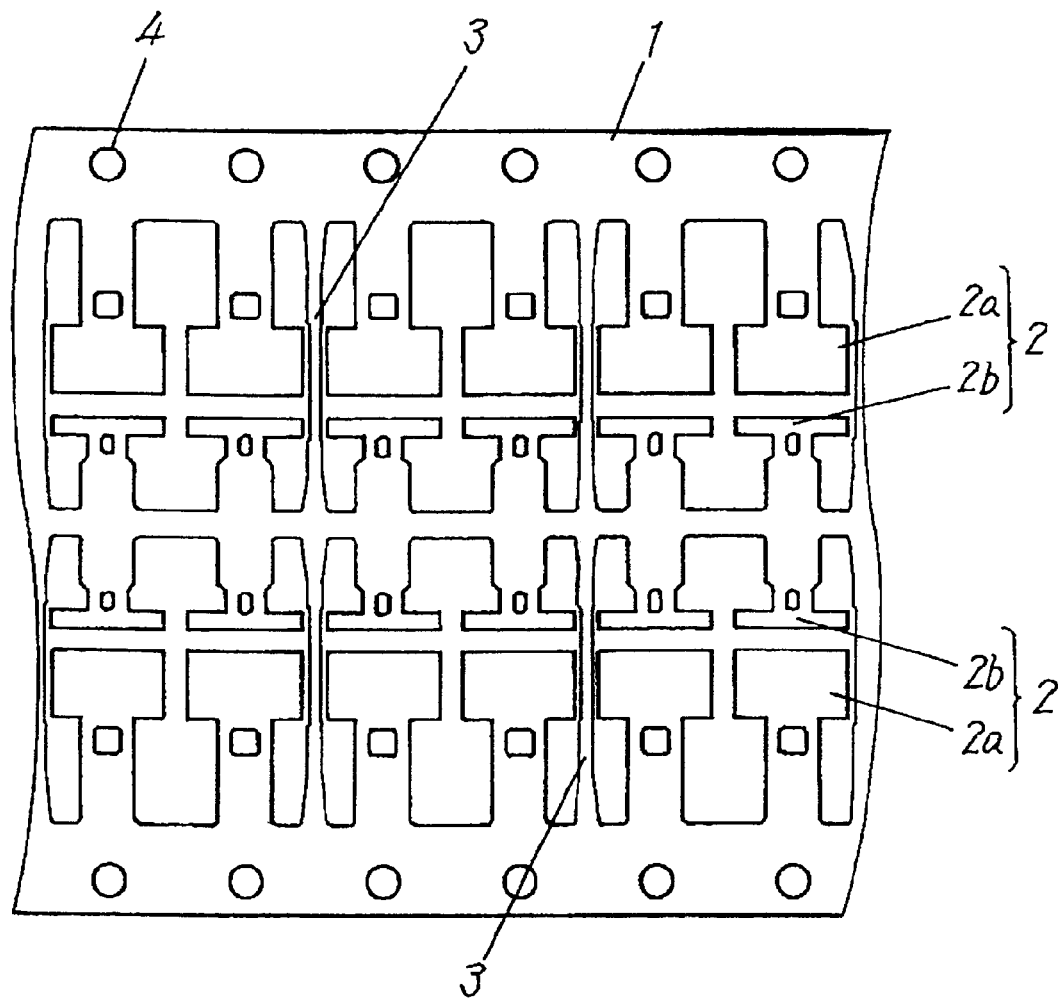
FIG. 1 is a plan view showing part of a metal lead frame used for manufacturing a solid electrolytic capacitor in a first exemplary embodiment of the present invention.

Referring to FIG. 1, a terminal section 2, formed of a pair of negative electrode terminal 2a and positive electrode terminal 2b, is provided continuously at a certain regular interval along the length direction of a hoop metal lead frame 1, and a crosspiece 3 is provided connecting both sides of the lead frame 1, which crosspiece being disposed one for every two terminal sections 2. The lead frame 1 is provided with the terminal section 2 for two rows in the width, and a transfer perforation 4 in the side edges at a certain predetermined regular interval.

Figure 2:
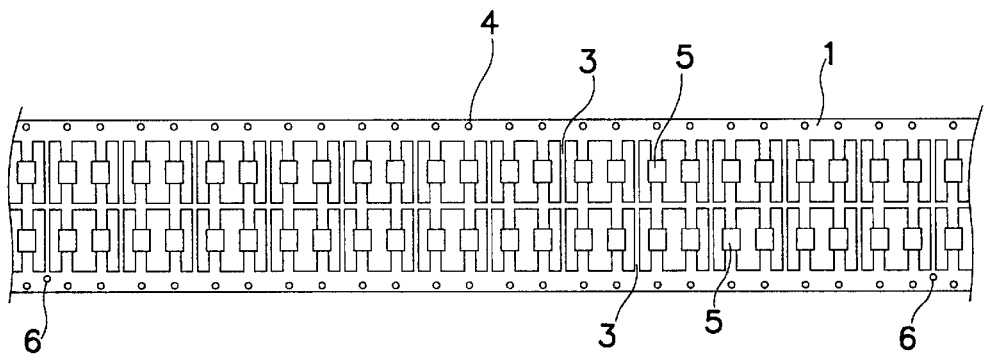
FIG. 2 shows a state of the metal lead frame of FIG. 1 mounted with solid electrolytic capacitor elements.

As shown in FIG. 2, solid electrolytic capacitor elements 5 are mounted on the metal lead frame 1 at the terminal section 2. The negative electrode and the positive electrode (neither of them are shown) of capacitor element 5 are coupled, respectively, with terminal section 2a and the terminal section 2b, and the capacitor element 5 is fixed on the terminal section 2. The solid electrolytic capacitor element 5 is formed of a plurality of laminated sheets.

Figure 3:
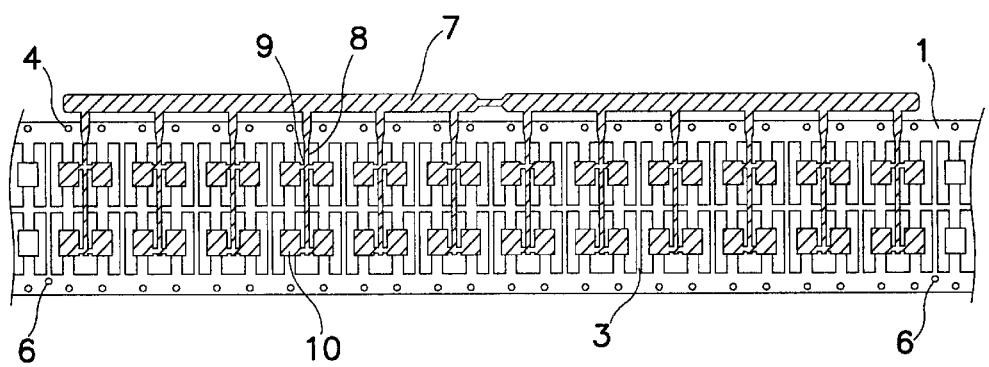
FIG. 3 shows a state of the solid electrolytic capacitor elements of FIG. 2 encapsulated with resin.

As shown in FIG. 3, the metal lead frame 1 mounted with the capacitor elements 5 is placed in a multi-cavity molding die so that a main runner 7 is locating close to and along one side, in terms of the width direction, of the lead frame 1 and a sub runner 8, which is branching out from the main runner 7, is locating at a region between the capacitor elements 5 where no crosspiece 3 exists. Molding resin is supplied to the capacitor elements 5 through a gate portion 9 provided in the sub runner 8. The capacitor elements 5 are encapsulated by the resin, and pluralities of solid electrolytic capacitors 10 (in FIG. 3, 48 pcs. are shown) are manufactured at a single shot.

The metal lead frame 1 is provided with a reference hole 6 at the beginning point and the end point of each span corresponding to a number of capacitor elements that can be molded at one shot. The transfer pitch of the lead frame can be made sure by detecting the reference hole 6 with a sensor (not shown) at the molding stage. In case any dislocation is detected, preventive measures may be taken in advance to avoid resultant troubles. The reference hole 6 is provided only in one side of the lead frame 1; therefore, if a lead frame 1 is supplied reversed by mistake or by an unexpected reason, it can be found out easily and troubles can be prevented.

In the present exemplary embodiment, the crosspiece 3 is provided one for every two capacitor elements, as shown in FIG. 3; hence, respective capacitor elements 5 are separated alternately by a space containing the crosspiece 3 and a space without having the crosspiece 3. Since the sub runner 8 has been provided in the space without having the crosspiece 3, the operation of peeling the main runner 7 and the sub runner 8 off the lead frame 1 breaks the gate portion 9, and the solid electrolytic capacitors 10 formed integrated on the metal lead frame 1 are separated from the main runners. Namely, the main runner 7 and the sub runner 8 have been formed irrelevant to the crosspiece 3 of the metal lead frame 1; therefore, a force exerted for the separation hardly reaches the solid electrolytic capacitors 10. Thus, the conventional problem that a stress generated at the separation of the runners degrades the hermetic sealing between the molding resin of solid electrolytic capacitor 10 and the lead frame 1 will not arise with the present embodiment.

Embodiment 2

A method of joining a first and a second metal lead frames of a certain specific length together is described with reference to FIG. 4(a)–FIG. 4(c).

Figures 4A, 4B, 4C:
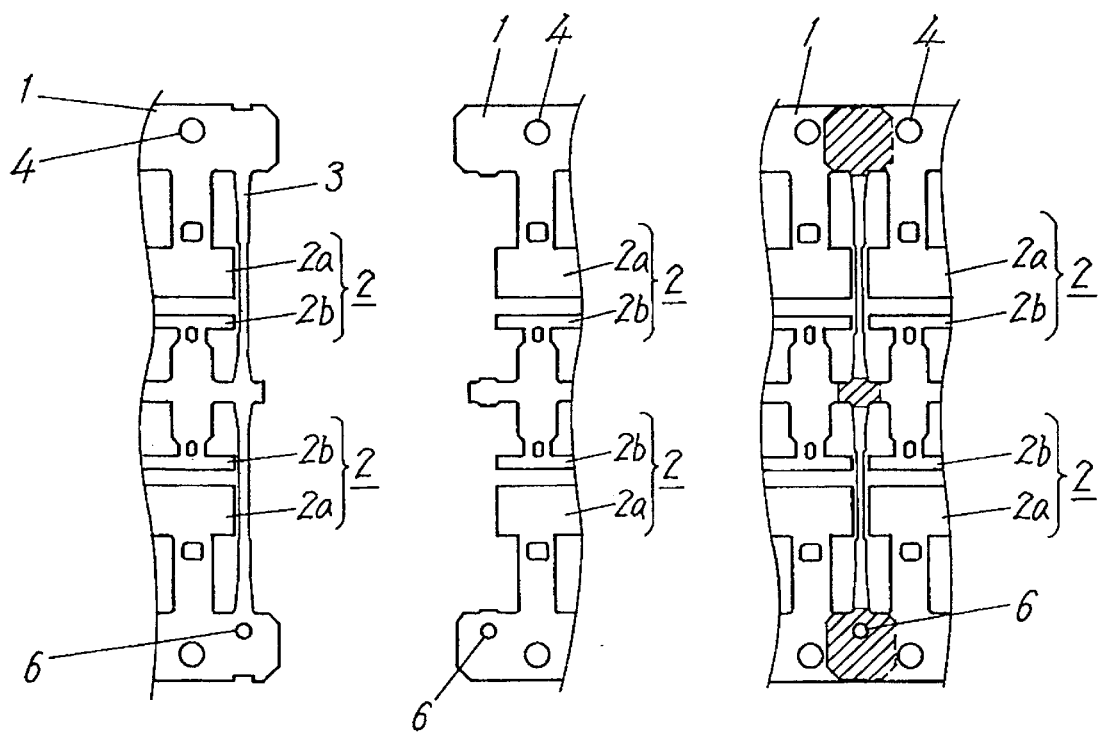
FIG. 4(a), FIG. 4(b) and FIG. 4(c) are plan views used to show a method of joining metal lead frames in a second exemplary embodiment of the present invention.

As shown in FIG. 4(a), end of a first metal lead frame 1 is cut at the location of the reference hole 6, provided for location detection, with the crosspiece 3 retained thereon. Next, as shown in FIG. 4(b), beginning of a second metal lead frame 1 is cut at the location of the reference hole 6, with the crosspiece 3 eliminated. And then, as shown in FIG. 4(c), the end part of first lead frame 1 as shown in FIG. 4(a) and the beginning part of second lead frame as shown in FIG. 4(b) are overlaid and connected together sharing the reference hole 6 in common.

By the above described method of joining, a single piece of metal lead frame can be formed, with two lead frames overlapping in the shadowed area as shown in FIG. 4(c). Thus the metal lead frame can be supplied on continuous basis enabling a continuous production. Furthermore, since the reference hole 6 locates in the overlapping area, it does not invite any inconvenience such as displacement of the transfer pitch for encapsulating the capacitor elements in the molding die. This provides a significant contribution to the productivity and in the manufacturing cost.

Embodiment 3

Figures 5A, 5B:
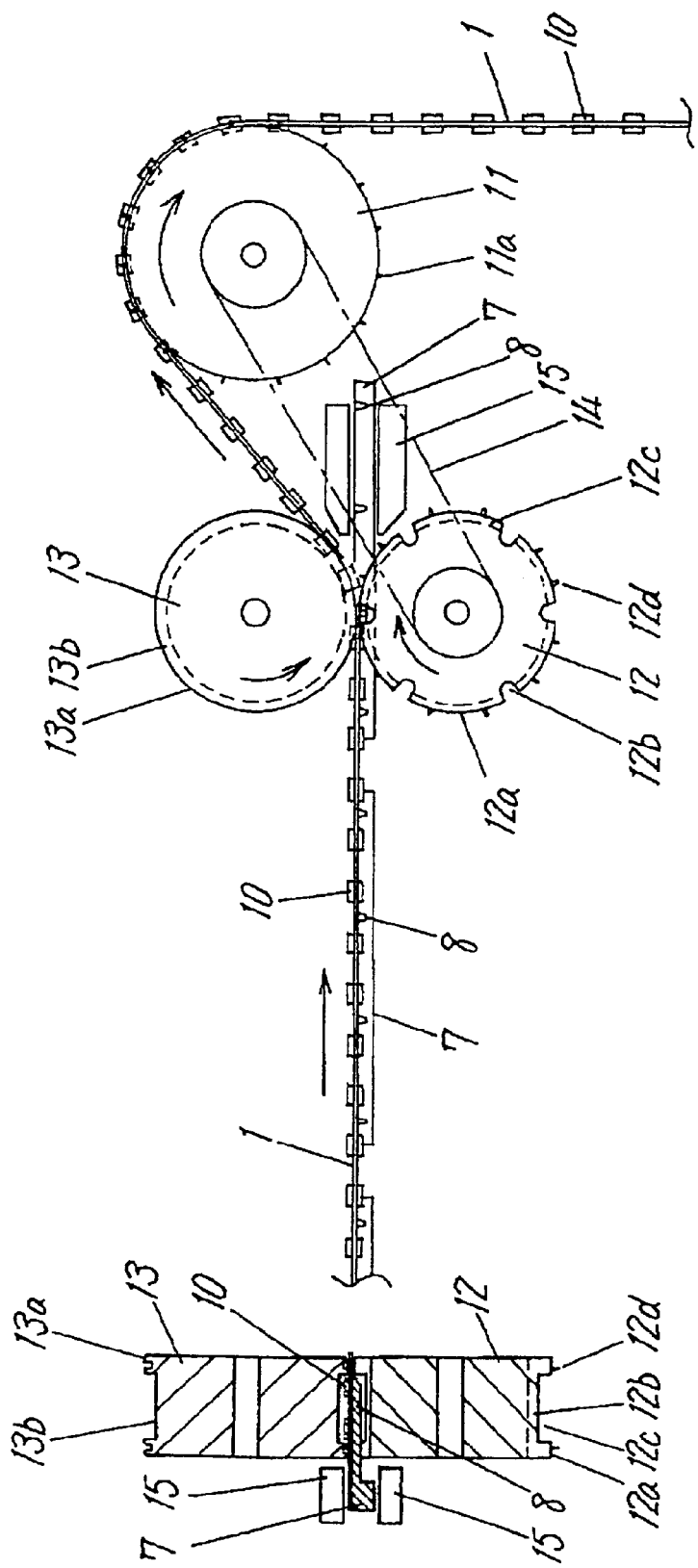
FIG. 5(a) and FIG. 5(b) show the structure of a machine for manufacturing a solid electrolytic capacitor in a third exemplary embodiment of the present invention.
Figure 6:
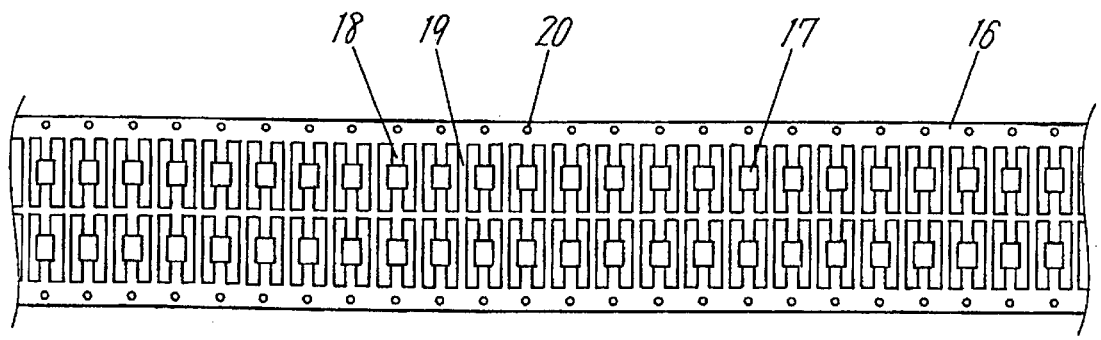
FIG. 6 is a plan view showing part of a metal lead frame used for manufacturing conventional solid electrolytic capacitors, mounted with the capacitor elements.
Figure 7:
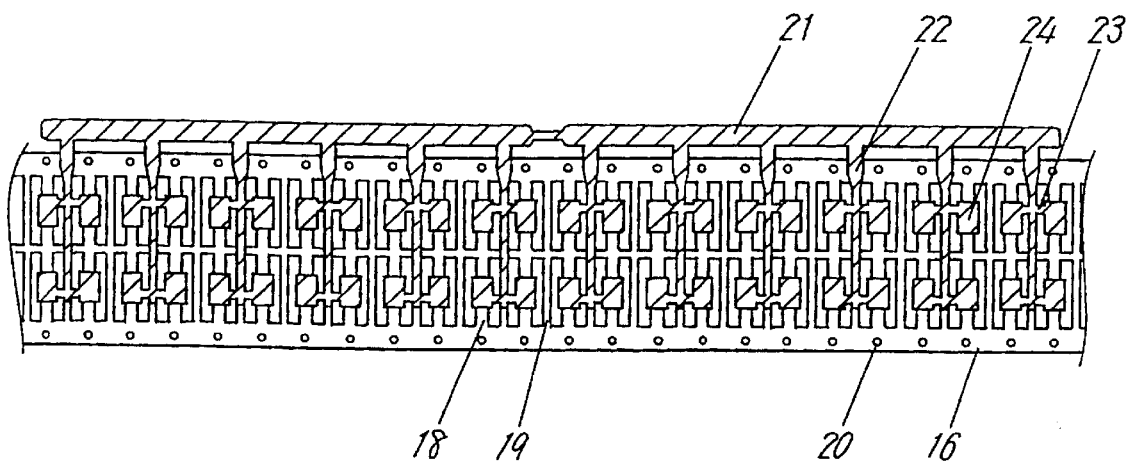
FIG. 7 shows a state of the capacitor elements of FIG. 6 encapsulated with molding resin.

Referring to FIG. 5(a) and FIG. 5(b), description is made on a manufacturing machine that peels and separates the metal lead frame, on which solid electrolytic capacitors are formed and integrated, from the runners.

The machine is formed of a transfer roller 11, a teethed roller 12, a pressure roller 13, a timing belt 14 and a runner guide 15. The transfer roller 11 is provided with a pilot pin 11a, which is to be engaged with the transfer perforation 4 (ref. FIG. 1) of the metal lead frame 1. The teethed roller 12 is provided with a press section 12a for giving pressure onto the metal lead frame 1, an escape section 12b for providing an escaping space for the sub runner 8, a product escape section 21c for providing an escaping space for the solid electrolytic capacitor 10 and a pilot pin 12d that fits into the transfer perforation 4 (ref. FIG. 1). The pressure roller 13 is provided with a press section 13a for giving pressing onto the lead frame 1 and a product escape section 13b for providing an escaping space for the solid electrolytic capacitor 10. The timing belt 14 is provided between the transfer roller 11 and the teethed roller 12. The runner guide 15 is provided in a pair for guiding the main runner 7 from the upper and the bottom directions.

Clockwise revolution (in the drawing) of the transfer roller 11, with the pilot pin 11a engaged with the transfer perforation 4 of metal lead frame 1, transfers perforation 4 of metal lead frame 1, transfers the lead frame 1 to the right (in the drawing). At this stage, the lead frame 1 is firmly held from the upper and the bottom surfaces by the press section 12a of teethe roller 12 and the press section 13a of pressure roller 13. The solid electrolytic capacitor 10 is supported free of contact by virtue of the product escape section 12c of teethed roller 12 and the product escape section 13b of pressure roller 13. The sub runner 8 is also supported free of contact by virtue of the escape section 12b of teethed roller 12. Namely, the metal lead frame 1 is held firmly from the upper and the bottom surfaces by the pressure roller 13 and the teethed roller 12, with the exception of solid electrolytic capacitor 10 and sub runner 8.

When the transfer roller 11 revolves, the metal lead frame 1 is pulled to move upward towards the transfer roller 11 in the right (in the drawing), whereas the main runner 7 proceeds straight forward to the right (in the drawing) being guided by the runner guide 15. The sub runner 8 also proceeds to the same direction accompanied by the main runner 7. Then the gate portion 9 is broken, and the runners 7, 8 alone are severed from the lead frame 1; the point of severance locating somewhere between the pressure roller 13 making contact with the teethed roller 12 and the beginning edge of the runner guide 15. The lead frame 1 carrying the solid electrolytic capacitors 10 is hooked by and transferred to the transfer roller 11.

Under the present manufacturing machine, runners can be easily severed by making use of a simple-structured runner guide 15, and the metal lead frame 1 is kept free from a force or a stress generated at the severance operation. Therefore, the severance does not ill affect the hermetic sealing of encapsulation, and solid electrolytic capacitors of high reliability may be offered.

The present invention can be embodied in various forms, without departing from the spirit or the main feature. For example, although the above exemplified metal lead frames 1 are provided with the terminal section 2 for two rows in the width direction of the lead frame, it is to be understood that such disclosure is not to be interpreted as limiting. The terminal section may of course be provided in one row. Accordingly, it is intended that the appended claims is interpreted as covering all alterations and modifications as fall within the true spirit and scope of the invention.

What is claimed is:

1. A method for manufacturing a plurality of solid electrolytic capacitors, said method comprising the steps of:
   providing a metal lead frame having a plurality of terminal sections disposed at a regular interval along the length of the metal lead frame with spaces therebetween, the spaces alternately comprising a cross piece extending across the width of the metal lead frame and an opening so that there is one cross piece for every two terminal sections;
   mounting an electrolytic capacitor element on each terminal section;
   locating a molding die over the metal lead frame so that a main runner of the molding die extends along the length of at least one side of the metal lead frame and sub-runners of the molding die extending from the main runner are positioned within the spaces comprising an opening; and
   injecting a molding resin onto the electrolytic capacitor elements through the main runner and sub-runners to encapsulate the electrolytic capacitor elements.

2. The method for manufacturing a plurality of solid electrolytic capacitors recited in claim 1, said method further comprising the step of:
   using reference holes in the metal lead frame to prevent dislocation of said metal lead frame, wherein said holes are located along the length of the metal lead frame to encompass the number of electrolytic capacitor elements that can be encapsulated in one molding operation.

3. The method for manufacturing a plurality of solid electrolytic capacitors recited in claim 2, wherein:
   metal lead frame is formed by joining a first metal lead frame to a second metal lead frame so that the reference hole provided at the end of the first metal lead frame overlies the reference hole provided at the beginning of the second metal lead frame.

4. The method for manufacturing a plurality of solid electrolytic capacitors recited in claim 3, wherein;
   after the capacitor elements are encapsulated with the molding resin, the sub-runners are peeled and severed from the metal lead frame while the metal lead frame is restrained.

5. The method for manufacturing a plurality of solid electrolytic capacitors recited in claim 2, wherein;
   the reference holes are provided to one side of the terminal sections.

6. The method for manufacturing a plurality of solid electrolytic capacitors recited in claim 5, wherein;
   after the capacitor elements are encapsulated with the molding resin, the sub-runners are peeled and severed from the metal lead frame while the metal lead frame is restrained.

7. The method for manufacturing a plurality of solid electrolytic capacitors recited in claim 2, wherein;
   after the capacitor elements are encapsulated with the molding resin, the sub-runners are peeled and severed from the metal lead frame while the metal lead frame is restrained.

8. The method for manufacturing a plurality of solid electrolytic capacitors recited in claim 1, wherein;
   after the capacitor elements are encapsulated with the molding resin, the sub-runners are peeled and severed from the metal lead frame while the metal lead frame is restrained.

* * * * *

UNITED STATES PATENT AND TRADEMARK OFFICE
CERTIFICATE OF CORRECTION

PATENT NO.    : 6,409,775 B1
DATED         : June 25, 2002
INVENTOR(S)   : Masatoshi Tasei et al.

It is certified that error appears in the above-identified patent and that said Letters Patent is hereby corrected as shown below:

Title page,
Item [57], ABSTRACT,
Line 1, after "having" delete ",".

Column 6,
Line 33, before the first occurrence of "metal" insert -- the --.

Signed and Sealed this

Fourth Day of March, 2003

JAMES E. ROGAN
*Director of the United States Patent and Trademark Office*